(12) United States Patent
Kalkbrenner et al.

(10) Patent No.: US 11,040,604 B2
(45) Date of Patent: Jun. 22, 2021

(54) FRAME OF A VEHICLE ROOF COMPRISING A CABLE GUIDE ELEMENT

(71) Applicant: Webasto SE, Stockdorf (DE)

(72) Inventors: Gabriel Kalkbrenner, Stockdorf (DE); Peter Reihl, Stockdorf (DE); Thomas Weiderer, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 13 days.

(21) Appl. No.: 16/485,301

(22) PCT Filed: Oct. 23, 2018

(86) PCT No.: PCT/EP2018/078958
§ 371 (c)(1),
(2) Date: Aug. 12, 2019

(87) PCT Pub. No.: WO2019/105653
PCT Pub. Date: Jun. 6, 2019

(65) Prior Publication Data
US 2020/0016964 A1     Jan. 16, 2020

(30) Foreign Application Priority Data

Nov. 28, 2017  (DE) .................... 10 2017 128 133.9
May 28, 2018   (DE) .................... 10 2018 112 725.1

(51) Int. Cl.
*B60J 7/057*   (2006.01)

(52) U.S. Cl.
CPC .................................... *B60J 7/057* (2013.01)

(58) Field of Classification Search
CPC ................................ B60J 7/057; B60J 7/0573
USPC .......................................... 296/223, 216.08
See application file for complete search history.

(56) References Cited

U.S. PATENT DOCUMENTS

| | | | |
|---|---|---|---|
| 5,188,420 A | 2/1993 | Maeda et al. | |
| 6,582,014 B1 * | 6/2003 | Racine | B60J 7/0435 296/216.08 |
| 6,830,291 B2 * | 12/2004 | Langguth | B60J 7/0573 296/216.08 |
| 7,354,103 B2 * | 4/2008 | Esteban | B60J 7/022 296/216.08 |
| 8,474,905 B2 * | 7/2013 | Manders | B60J 7/022 296/223 |

FOREIGN PATENT DOCUMENTS

| | | | |
|---|---|---|---|
| DE | 4422646 | * | 8/1995 |
| EP | 2072303 A1 | | 6/2009 |
| EP | 2826651 A1 | | 1/2015 |

OTHER PUBLICATIONS

International Preliminary Report on Patentability for PCT/EP2018/078958 dated Jun. 2, 2020; English translation submitted herewith (7 pages).
International Search Report for PCT/EP2018/078958 dated Feb. 12, 2019 and English Translation enclosed herewith (5 pages).

* cited by examiner

*Primary Examiner* — Dennis H Pedder
(74) *Attorney, Agent, or Firm* — Fitch, Even, Tabin & Flannery, LLP

(57) ABSTRACT

A frame of a vehicle roof which may have a cable guide element in which a cable duct for accommodating a drive cable for a displaceable roof element is formed, the cable duct being limited by a duct wall. The duct wall may have a buckling cutout whose length in the longitudinal direction of the cable duct is greater than a buckling limit length.

13 Claims, 7 Drawing Sheets

FRAME OF A VEHICLE ROOF COMPRISING A CABLE GUIDE ELEMENT

CROSS-REFERENCE TO RELATED APPLICATIONS

This application is a U.S. national phase application filed under 35 U.S.C. § 371 of International Application No. PCT/EP2018/078958, filed Oct. 23, 2018, designating the United States, which claims priority from German Patent Application No. 10 2017 128 133.9, filed Nov. 28, 2017, and German Patent Application No. 10 2018 112 725.1, filed May 28, 2018, which are hereby incorporated herein by reference in their entirety for all purposes.

FIELD

The invention relates to a frame of a vehicle roof having the features of the preamble of claim 1.

BACKGROUND

A frame of this kind is known from practice and is part of a roof opening system which comprises a sliding roof lid which can be displaced between a closed position, in which it closes a roof opening, and an open position, in which the roof opening is at least partially open. The frame typically comprises a front frame part, which extends in the transverse direction of the roof, and two longitudinal sections, which extend in the longitudinal direction of the roof and each form a guide rail for drive kinematics of the sliding roof lid. At their front ends, the guide rails or longitudinal sections can each have an end piece which forms a lifting sliding guide by means of which a front edge of the sliding roof lid can be lifted or lowered as the sliding roof lid is being displaced and which forms the point of intersection between the respective longitudinal section and the front frame part. A drive motor which drives two drive cables in order to drive the sliding roof lid is disposed in the area of the front frame part, each drive cable being guided in a cable duct assembly toward the kinematics, which are displaceable in the guide rails. The cable duct assemblies for the drive cables each comprise a cable duct formed in the front frame part, a cable duct formed in the end piece having the lifting sliding guide, and a cable duct formed in a guiding portion of the respective guide rail. The guiding portion may consist of an extruded aluminum profile. The front frame part and the end pieces may be molded plastic parts. The cable ducts formed in these components can extend in such a manner that first and second wall portions alternately surround the respective drive cable from two sides, the drive cable being exposed through a respective cutout at the side facing away from the respective wall portion.

In an accident situation in which the sliding roof lid is in its open position and is subjected to acceleration in the direction of the front of the vehicle, the acceleration forces are transmitted to the drive cables through the drive kinematics. If the cutouts of the alternating cable guides or cable ducts have lengths of more than 10 mm in the longitudinal direction of the respective cable duct, there is a risk of substantially unchecked buckling of the drive cables through the cutouts due to the forces introduced by the sliding roof lid. Thus, no deceleration forces would be exerted on the sliding roof lid. However, if the cutouts are shorter than 8 mm in the longitudinal direction of the respective cable duct, buckling of the respective drive cable thus being prevented, there is the problem that the forces exerted by the sliding roof lid are transmitted directly to all components in the force path, which, in turn, may lead to component failure.

SUMMARY

The object of the present invention is to provide a frame of the kind mentioned above that allows systematic reduction of acceleration forces introduced through a sliding roof lid in the event of an accident of the vehicle in question.

According to the invention, this object is attained by the frame having the features of claim 1.

According to the invention, the cable guide element of the frame having the cable duct is provided with a defined opening whose length is selected such that the drive cable guided in the cable duct can systematically buckle, i.e. can exit the cable duct at the side, when forces that exceed a limit are active in the axial direction of the drive cable.

Systematic buckling of the drive cable through the buckling cutout has the effect that any kinematic energy introduced into the respective drive cable in the event of an accident, for example, is continuously reduced. After buckling and possible stopping of the buckled cable portion against a stop surface, which may be formed by the cable guide element in which the cable duct is formed or by another vehicle component, the drive cable blocks further displacement of the sliding roof lid. With the systematic continuous reduction of the kinematic energy, the duct wall of the cable duct of the respective cable guide element or of another cable guide element in which the respective drive cable is guided can be protected against overload and thus against damage.

The buckling limit length is the length starting from which the drive cable can buckle through the buckling cutout in the first place for technical reasons.

In a specific embodiment of the frame according to the invention, the length of the buckling cutout in the axial direction of the cable duct is less than a critical buckling length. The critical buckling length is the length of a cutout starting from which substantially unchecked buckling of the drive cable through the respective cutout can occur. In the case of a cable diameter of about 5.0 mm to 5.5 mm, the critical buckling length is about 9.5 mm to 10.5 mm and in particular about 10 mm.

The buckling limit length, below which buckling of the drive cable is substantially precluded, is about 7.5 mm to 8.5 mm and in particular about 8.0 mm for a drive cable having a diameter of about 5.0 mm to 5.5 mm.

The cable duct preferably has a diameter that corresponds to the diameter of the drive cable, in particular a diameter of about 5.0 mm to 5.5 mm in a projection in the longitudinal direction of the cable or along the cable duct axis.

For example, the drive cable is a helical cable surrounded by a wire coil or a plastic cable.

In a preferred embodiment of the frame according to the invention, the buckling cutout is adjacent to a damping funnel whose cross-sectional area becomes smaller starting from the buckling cutout so that a systematic counterforce can be exerted on the drive cable when the drive cable buckles. The damping funnel receives the buckling portion of the drive cable. The buckling portion is in contact with side walls of the damping funnels, which run toward each other starting from the buckling cutout, thereby exerting a continuously increasing counterforce on the drive cable as it buckles. The counterforce should always be less than the forces that would lead to failure or damage of the mechanism.

The cable guide element which is provided with the cable duct configured according to the invention may be a guide rail in which a drive mechanism of a roof opening system is guided, a sliding guide element which is connected to a guide rail, a transverse frame part, in particular a front frame part or a rear frame part, a longitudinal frame part or a guide tube integrated in the frame.

A specific embodiment provides a frame comprising a cable guide element which has a cable duct which forms an alternating cable guide with the first end second wall portions disposed alternately one behind the other in the longitudinal direction of the duct, said cable duct having exactly one cutout that is a buckling cutout through which the drive cable guided in the cable duct can buckle under great axial forces. The other cutouts of the cable duct are shorter in the axial direction, buckling through these cutouts thus being precluded.

In another specific embodiment of the frame according to the invention, in which the cable guide element is a guide rail, the guide rail is a profile in which the cable duct is formed, the duct wall having the buckling cutout being formed by a rib of the guide rail that extends in the longitudinal direction of the guide rail, and the buckling cutout being formed by a recess of the rib. In this embodiment, the kinematic energy introduced into the drive cable is thus reduced as early as in the area of the guide rail in which the kinematics of the respective mobile roof element are guided. Thus, cable guide elements that are disposed downstream of the guide rail, such as a transverse frame part or the like, are also effectively protected against overload. A drive slide which is guided in the respective guide rail starts to move once the drive cable has buckled through the buckling cutout and will stop at the latest once it has reached the position of the buckling cutout.

Since a sliding roof lid is typically shifted in the direction of the front of the vehicle when being displaced from an open position into a closed position, the recess of the rib is disposed in the area of a front half, in particular of a front third, of the guide rail in a specific embodiment of the frame according to the invention. Thus, following high acceleration during displacement in the direction of the front of the vehicle, which occurs in the event of an accident, in particular, the sliding roof lid is effectively decelerated until it comes to a stop in the area of the recess of the rib.

The guide rail is preferably an extruded aluminum profile, in which case the buckling cutout is formed by a milled-out notch in the respective rib.

The frame according to the invention may be a frame of a roof opening system or a frame of a shading system of the vehicle roof, but it may also be a frame that forms part of both systems. Moreover, the frame can be of an open design, which means that it can be composed of only two longitudinal frame parts that are connected via one transverse frame part. The transverse frame part can be composed solely of guide tubes that guide the drive cable to the longitudinal frame parts which are provided with the cable guide element configured according to the invention.

Other advantages and advantageous embodiments of the subject-matter of the invention are apparent from the description, the drawing and the claims.

In the drawing, embodiments of a frame according to the invention are illustrated in a schematically simplified manner and will be explained in more detail in the following description.

BRIEF DESCRIPTIONS OF THE DRAWINGS

DETAILED DESCRIPTION

Figure 1:
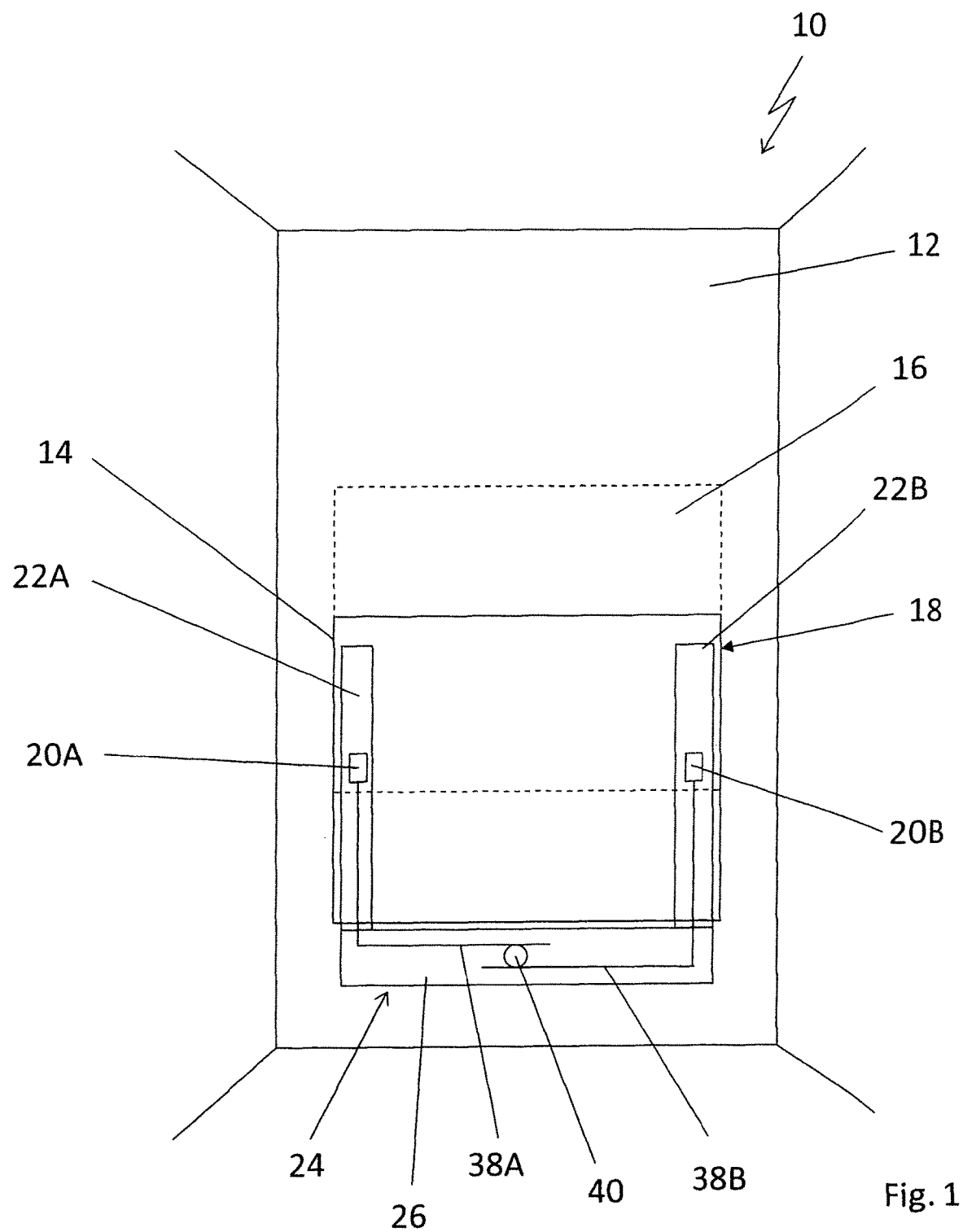
FIG. 1 is a top view of a vehicle roof comprising a roof opening system and a frame thereof.

FIG. 1 shows a roof 10 of a vehicle configured as a passenger vehicle. Roof 10 comprises a solid roof portion 12 in which a roof opening 14 is formed. Roof opening 14 can be selectively closed or at least partially opened by means of a sliding roof lid 16 of a roof opening system 18.

Sliding roof lid 16 of roof opening system 18 is provided with displacement kinematics 20A and 20B, respectively, on either side of a vertical longitudinal center plane of the roof, displacement kinematics 20A and 20B being guided in guide rails 22A and 22B, respectively, which extend in the longitudinal direction of the roof or vehicle and are disposed along the respective lateral edge of roof opening 14.

Guide rails 22A and 22B are side beams of a roof frame 24 and are connected to each other at their front ends via a front frame part 26 which forms a transverse frame part of roof frame 24, the transverse frame part extending in the transverse direction of the roof. Roof frame 24 is substantially mirror-symmetrical with respect to a vertical longitudinal center plane of the roof, which is why, for the sake of clarity, the following description will substantially be limited to guide rail 22B, which is disposed on the left with respect to the forward direction of travel of the vehicle in question. Guide rail 22A, which is disposed on the right with respect to the forward direction of travel of the vehicle in question, is apparent from the description analogously.

Figure 2:
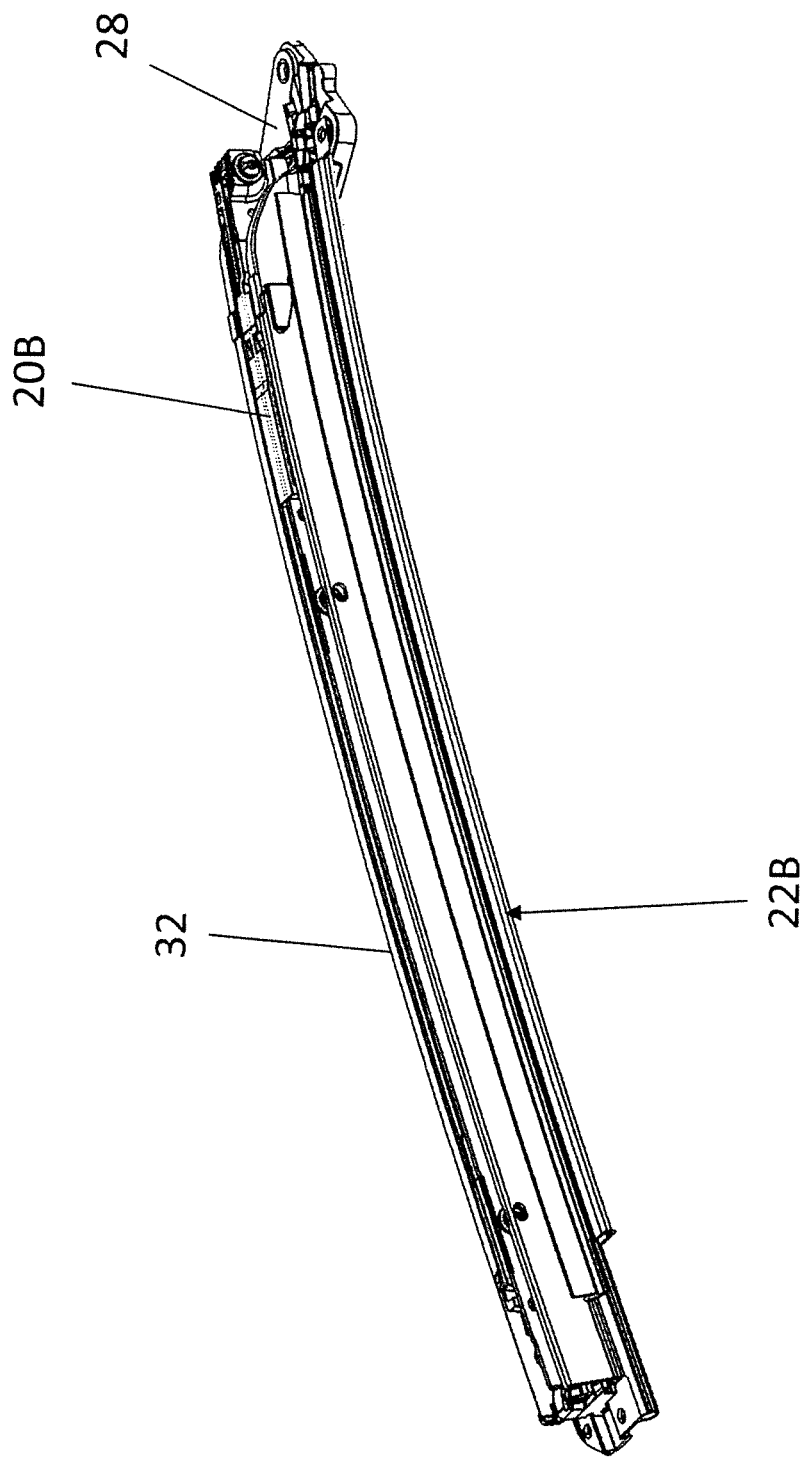
FIG. 2 is a perspective interior view of a side beam of the frame.
Figure 3:
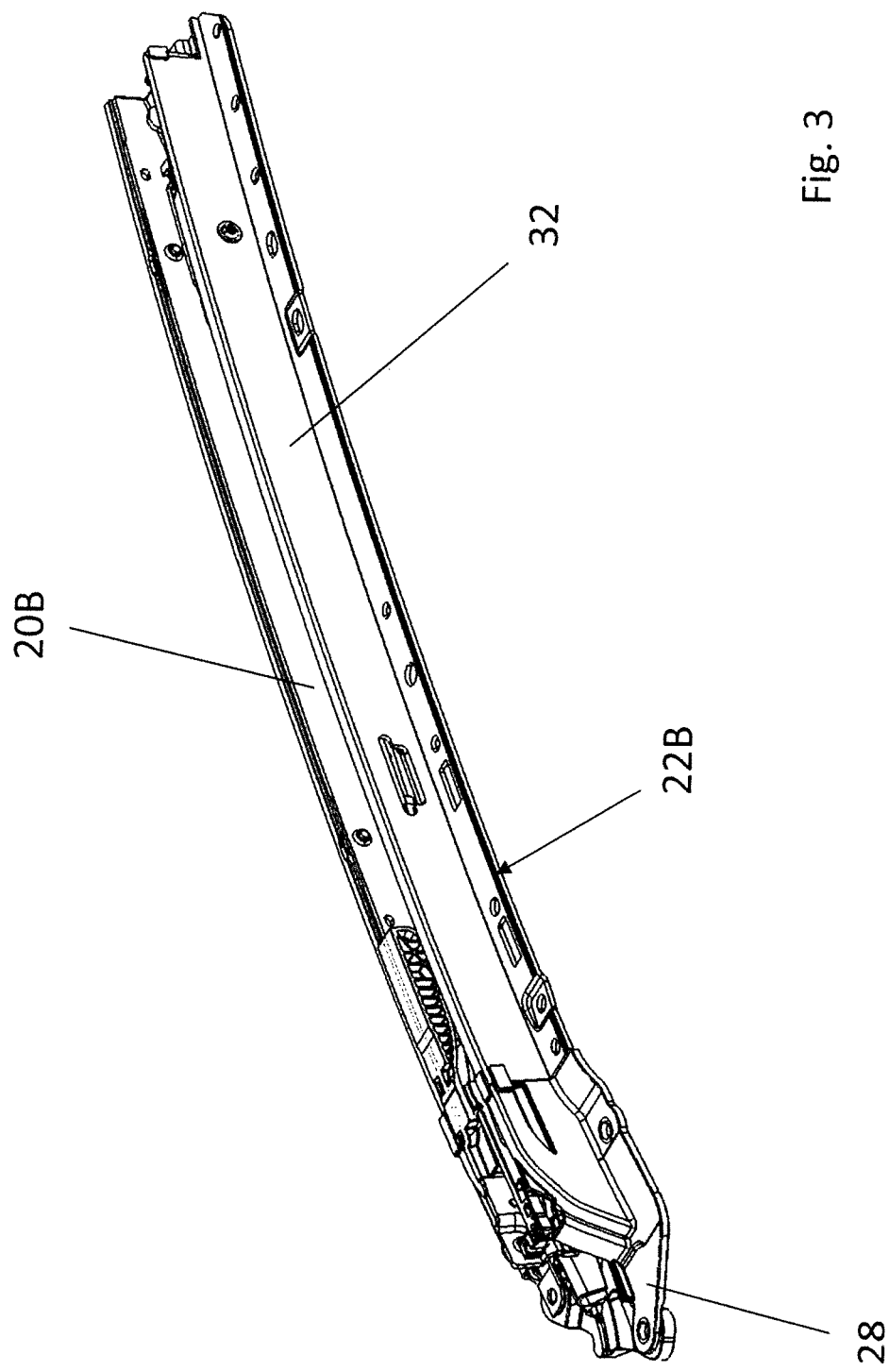
FIG. 3 is a perspective exterior view of the side beam.
Figure 4:
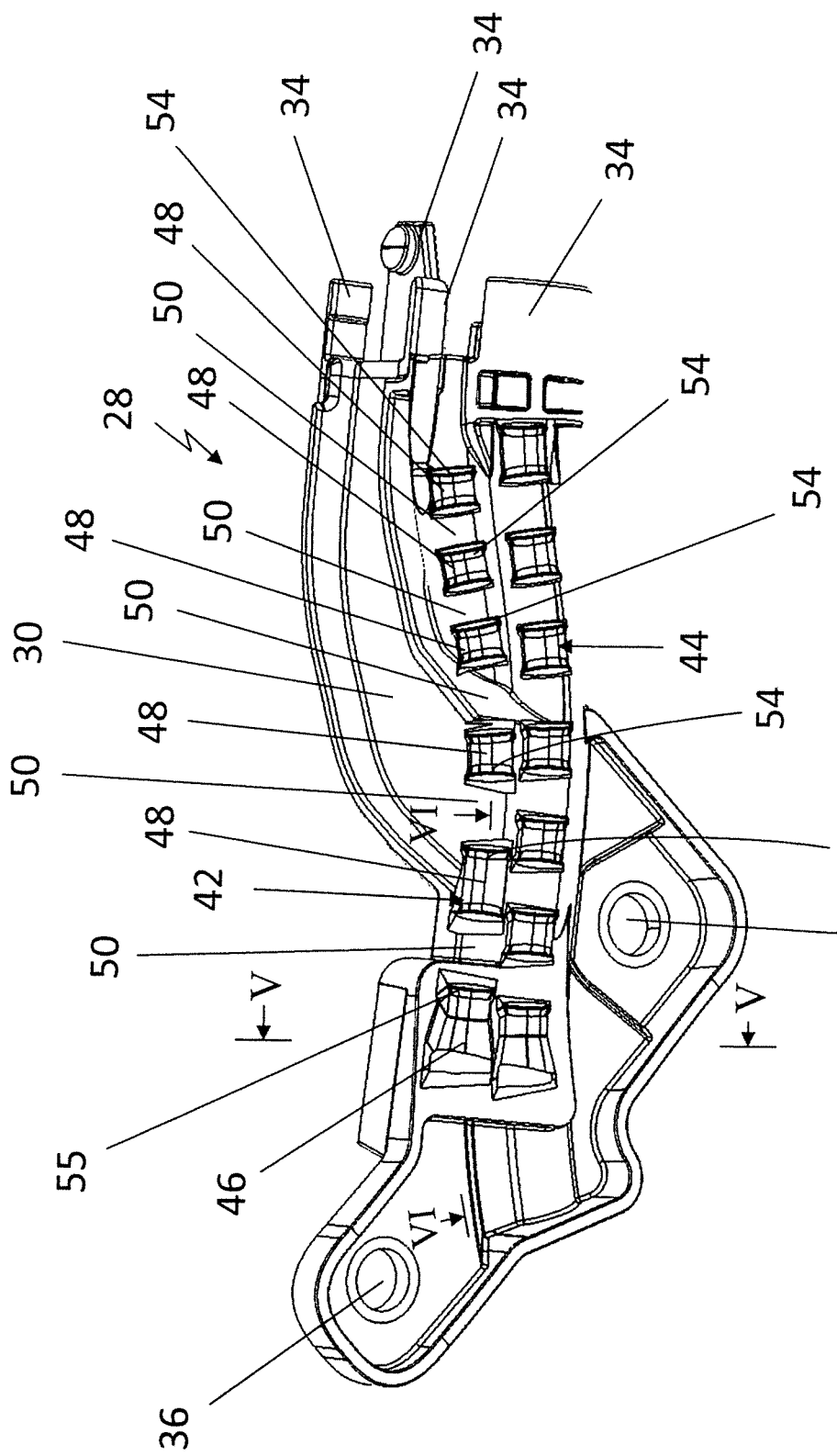
FIG. 4 is a perspective bottom view of a front sliding guide element of the side beam.
Figure 5:
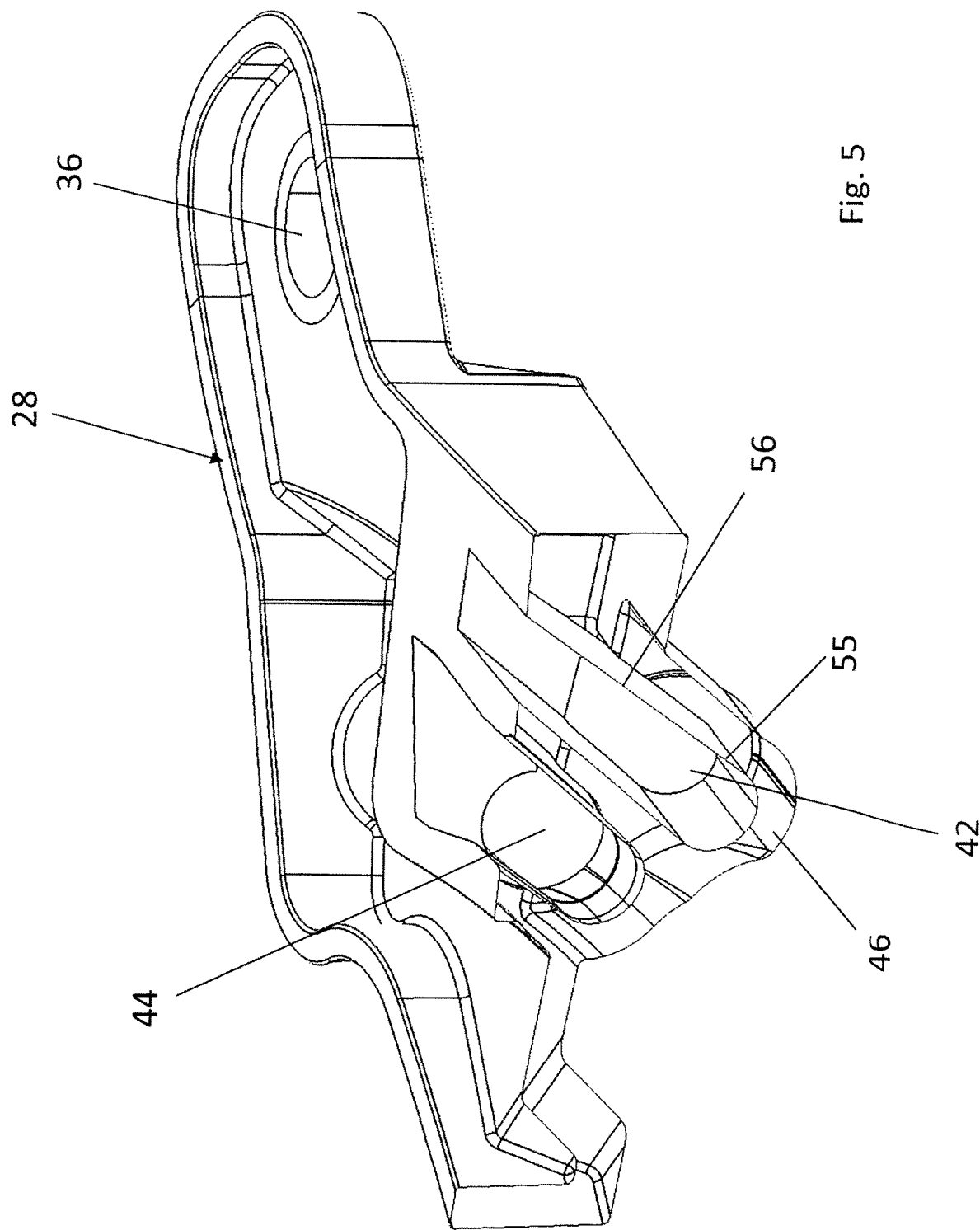
FIG. 5 is a perspective section view of the sliding guide element along line V-V in FIG. 4.
Figure 6:
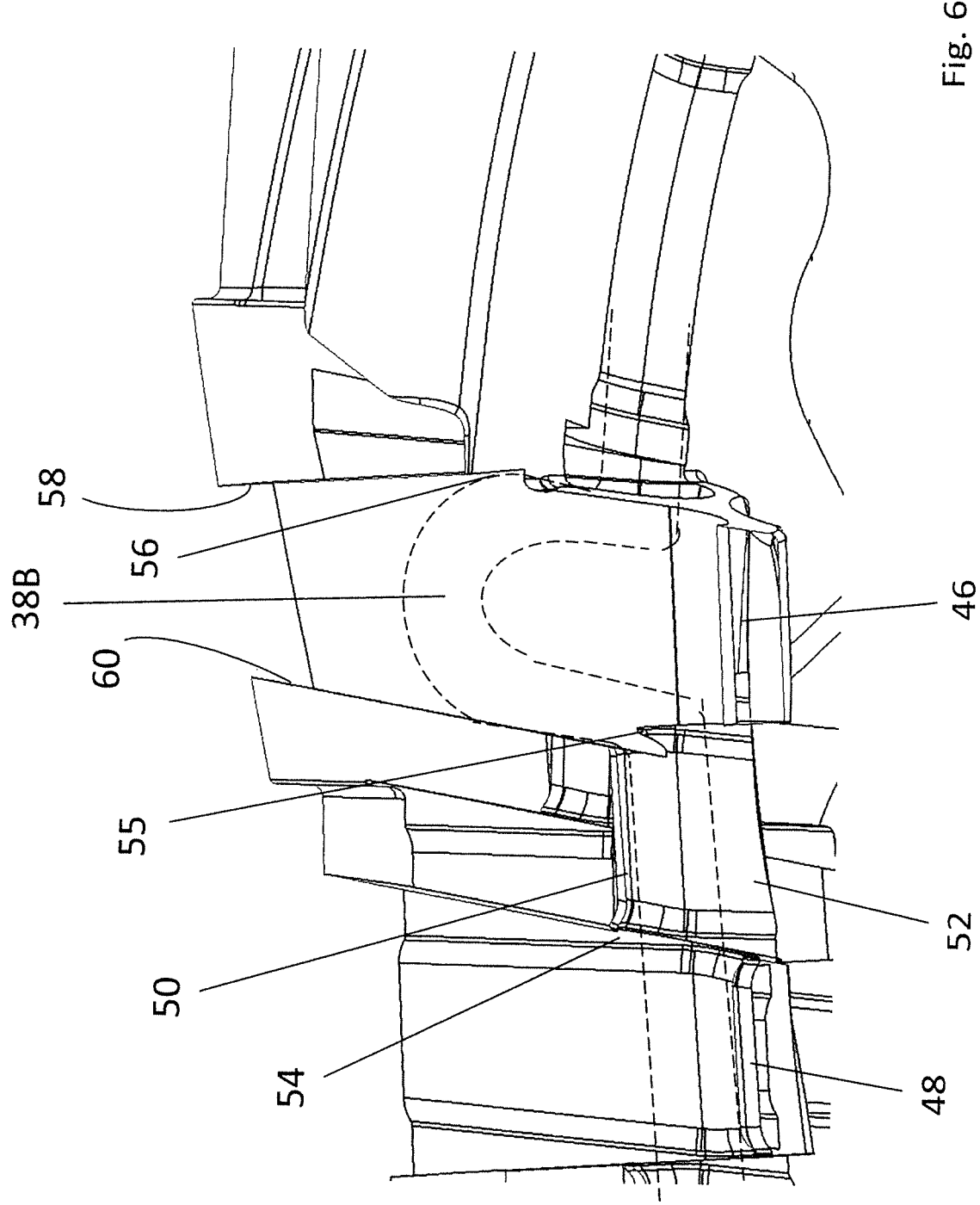
FIG. 6 shows a section through the sliding guide element along line VI-VI in FIG. 4.

As can be seen from FIGS. 2 and 3, guide rail 22B has an end piece 28 in its area of transition to front frame part 26, end piece 28 being illustrated on its own in FIGS. 4 to 6. End piece 28, which is an injection-molded plastic part, comprises a lifting sliding guide 30 in which a slide is guided when sliding roof lid 16 is being displaced from the closed position into the open position, allowing a front edge of sliding roof lid 16 to be lifted relative to solid roof portion 12. For end piece 28, which is a sliding guide part, to be fixed on a guide portion 32 of guide rail 22B, which is an extruded aluminum profile, end piece 28 comprises latching and positioning tabs 34. In order to be able to connect guide rail 22B to front frame part 26, end piece 28 has screw openings 36.

For driving displacement kinematics 20A and 20B, roof opening system 18 has drive cables 38A and 38B which are driven by a shared drive motor 40 or by a pinion thereof. Drive cables 38A and 38B are each guided, via a cable guide in front frame part 26, into a cable duct 42 of end pieces 28 and from there into corresponding cable ducts of guide portions 32 of guide rails 22A and 22B and are each connected to a drive slide (not shown) of respective displacement kinematics 20A and 20B in guide rails 22A and 22B, respectively.

Owing to the design of cable duct 42, end piece 28, which is produced by injection molding, constitutes a cable guide element. In addition to cable duct 42, a second cable duct 44, which serves to guide a drive cable of a shading system of roof 10, is formed in end piece 28.

Cable duct 42 is an alternating cable guide formed by first wall portions 46 and 48, which limit cable duct 42 from a first side, and second wall portions 50, which limit cable duct 42 from a second side. This has the effect that drive cable 38B is alternately guided from the first side by means of first wall portions 46, 48 and from a second side by means of second wall portions 50. First wall portions 46 and 48 are each separated by a first cutout 52 located opposite a respective second wall portion 50. Second wall portions 50 are each separated by a second cutout 54 located opposite a respective first wall portion 48. A cutout 55 which limits second wall portion 50 is located opposite first wall portion 46.

Cutout 55 located opposite first wall portion 46 has a length of about 9 mm. The other cutouts 52 and 54 have a length of less than 8 mm in the longitudinal direction of cable duct 42. Thus, cutout 54 located opposite first wall portion 46 has a length that is less than a critical buckling length of about 10 mm, starting from which drive cable 38B could buckle through cutout 54 substantially unchecked. At the same time, cutout 55 located opposite first wall portion 46 has a length that is less than a buckling limit length of about 8.0 mm, below which drive cable 38B is substantially precluded from buckling as indicated by dashed lines in FIG. 6.

Drive cable 38B, which may be a compression-resistant helical cable, has a diameter of about 5.3 mm, which corresponds to the diameter of cable duct 42, cable duct 42 thus also having a diameter of about 5.3 mm in a projection along the longitudinal axis of the cable duct.

When drive cable 38B buckles through cutout 55, which is located opposite first wall portion 46 and forms a buckling cutout, as illustrated in FIG. 6, the buckling portion of drive cable 38B is decelerated by a damping funnel 56 which is adjacent to cutout 55 and which is formed by surfaces 58 and 60 of end piece 28 that run toward each other. This achieves that a defined counterforce is exerted on drive cable 38B, the force increasing the further drive cable 38B buckles through cutout 55. In the event of an accident, the thus-achieved systematic buckling of drive cable 38B into the pocket-like damping funnel leads to a continuous reduction of kinetic energy that is transmitted to drive cable 38B from accelerated sliding roof lid 16. Once a certain absolute buckling value is reached, damping funnel 56 blocks drive cable 38B, whereby further displacement of the sliding roof lid, which may in particular be a glass lid, is blocked. By allowing drive cable 38B to buckle, other components of roof opening system 18, in particular wall portions 46, 48 and 50 of cable duct 42, can be protected against overload and thus against damage. The counterforce exerted by damping funnel 56 should always be less than the force starting from which there is risk of damage to the displacement kinematics.

Cable duct 44 can be of the same design as cable duct 42.

Figure 7:
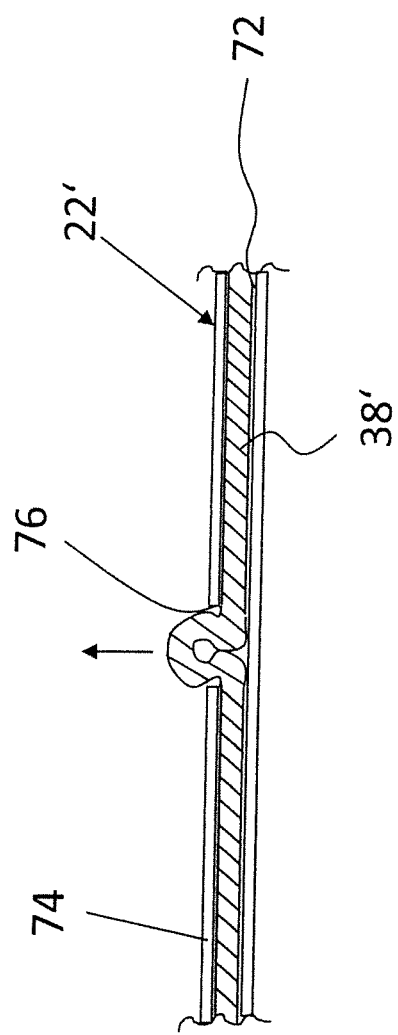
FIG. 7 shows a schematic longitudinal section through a guide rail having a buckling cutout.
Figure 8:
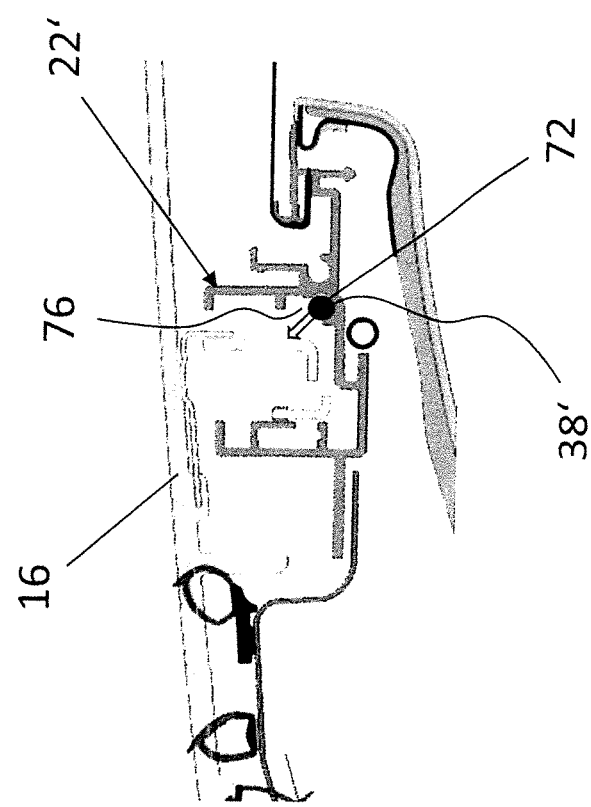
FIG. 8 shows a cross-section through the guide rail in the area of the buckling cutout.

In FIGS. 7 and 8, an alternative embodiment of the subject-matter of the invention is illustrated. This embodiment comprises a guide rail 22' which, like in the embodiment of FIGS. 1 to 6, constitutes a side beam of a roof frame which is part of a roof opening system of the kind illustrated in FIG. 1. Guide rail 22' is an extruded aluminum profile in which a cable duct 72 is formed, cable duct 72 being limited by, among other features, an upper rib 74, which forms a duct wall. A drive cable 38', which is a helical cable surrounded by a wire coil in this case, is guided in cable duct 72.

In a front portion of guide rail 22', rib 74 has a recess 76 which constitutes a buckling cutout for drive cable 38' and which has a length of about 10 mm in the longitudinal direction of the rail. This is a length that is greater than a buckling limit length of 8 mm and less than a critical buckling length of 10.5 mm.

When a sliding roof lid 16 of a roof opening system 18 driven by means of drive cable 38' is located in the open position, in which the roof opening in question is open, sliding roof lid 16 may be subjected to strong acceleration in the direction of a front of the vehicle in the event of an accident. Thus, high forces act on said drive cable 38' via a drive slide driven by drive cable 38'. However, owing to buckling cutout 76, drive cable 38' can buckle from cable duct 72, which leads to continuous reduction of the kinetic energy of sliding roof lid 16. Sliding roof lid 16 comes to a stop when the drive slide has reached the position of buckling cutout or recess 76.

REFERENCE SIGNS 10 roof
12 solid roof portion
14 roof opening
16 sliding roof lid
18 roof opening system
20A, B displacement kinematics
22A, B guide rail
22' guide rail
24 roof frame
26 front frame part
28 end piece
30 lifting sliding guide
32 guide portion
34 latching and positioning tab
36 screw opening
38A, B drive cable
38' drive cable
40 drive motor
42 cable duct
44 cable duct
46 first wall portion
48 first wall portion
50 second wall portion
52 first cutout
54 second cutout
55 cutout
56 damping funnel
58 surface
60 surface
72 cable duct
74 rib
76 recess

The invention claimed is:

1. A frame of a vehicle roof, the frame comprising: a cable guide element in which a cable duct for accommodating a drive cable for a displaceable roof element is formed, the cable duct being limited by a duct wall, wherein the duct wall has a buckling cutout whose length in the longitudinal direction of the cable duct is greater than a buckling limit length,
    wherein the length of the buckling cutout in the longitudinal direction of cable duct is less than a critical buckling length.

2. The frame according to claim 1, wherein the critical buckling length is about 9.5 mm to 10.5 mm.

3. The frame according to claim 1, wherein the buckling limit length is about 7.5 mm to 8.5 mm.

4. The frame according to claim 1, wherein the cable duct has a diameter of about 5.0 mm to 5.5 mm in a projection along the cable duct axis.

5. The frame according to claim 1, wherein the buckling cutout is adjacent to a damping funnel whose cross-sectional area becomes smaller starting from the buckling cutout.

6. The frame according to claim 1, wherein the cable guide element is a guide rail in which a drive mechanism of a roof opening system is guided, a sliding guide element connected to the guide rail, a transverse frame part, a longitudinal frame part or a guide tube integrated in the frame.

7. A frame of a vehicle roof, the frame comprising: a cable guide element in which a cable duct for accommodating a drive cable for a displaceable roof element is formed, the cable duct being limited by a duct wall, wherein the duct wall has a buckling cutout whose length in the longitudinal direction of the cable duct is greater than a buckling limit length,
wherein the cable guide element is a molded plastic part in which the cable duct for accommodating the drive cable for the displaceable roof element is formed, the cable duct alternately guiding the drive cable from a first side by means of first wall portions and from a second side by means of second wall portions, and the first wall portions and the second wall portions forming the duct wall, each first wall portion being adjacent to at least one first cutout which is located opposite a respective second wall portion, and each second wall portion being adjacent to at least one second cutout which is located opposite a respective first wall portion, and one of the cutouts being the buckling cutout, whose length in the longitudinal direction of cable duct is greater than a buckling limit length, and the lengths of the other cutouts in the longitudinal direction of cable duct being less than the buckling limit length.

8. The frame according to claim 6, wherein the guide rail is an extruded profile in which the cable duct is formed, the duct wall with the buckling cutout being formed by a rib of the guide rail that extends in the longitudinal direction of the guide rail, and the buckling cutout being formed by a recess of the rib.

9. The frame according to claim 8, wherein the recess is disposed in the area of a front half, in particular of a front third, of the guide rail.

10. The frame according to claim 8, wherein the guide rail is made of aluminum.

11. The frame according to claim 1, wherein the critical buckling length is about 10 mm.

12. The frame according to claim 1, wherein the buckling limit length is about 8.0 mm.

13. The frame according to claim 6, wherein the transverse frame part is one of a front frame part and a rear frame part.

* * * * *